(12) United States Patent
Fisher (10) Patent No.: US 12,397,376 B2
(45) Date of Patent: Aug. 26, 2025

(54) OFF-AXIS LASER BEAM MEASUREMENT FOR LASER POWDER BED FUSION

(71) Applicant: RTX Corporation, Farmington, CT (US)

(72) Inventor: Brian A. Fisher, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 189 days.

(21) Appl. No.: 18/305,628

(22) Filed: Apr. 24, 2023

(65) Prior Publication Data

US 2023/0347452 A1  Nov. 2, 2023

Related U.S. Application Data (60) Provisional application No. 63/335,906, filed on Apr. 28, 2022.

(51) Int. Cl.
*B23K 26/70* (2014.01)
*B22F 10/28* (2021.01)
*B23K 26/342* (2014.01)
*B33Y 10/00* (2015.01)

(52) U.S. Cl.
CPC ............ *B23K 26/705* (2015.10); *B22F 10/28* (2021.01); *B23K 26/342* (2015.10); *B33Y 10/00* (2014.12)

(58) Field of Classification Search
CPC ..... B23K 26/342; B23K 26/705; B22F 10/28; B33Y 10/00
See application file for complete search history.

(56) References Cited

U.S. PATENT DOCUMENTS

| | | | |
|---|---|---|---|
| 10,315,252 B2 | 6/2019 | Symeonidis et al. | |
| 10,933,468 B2 * | 3/2021 | Jones | B29C 64/393 |
| 11,155,033 B2 | 10/2021 | Zeulner et al. | |
| 2018/0161925 A1 | 6/2018 | Harding | |

(Continued)

FOREIGN PATENT DOCUMENTS

| | | |
|---|---|---|
| EP | 3689503 A1 | 8/2020 |
| EP | 3747571 A1 | 12/2020 |
| EP | 3542994 B1 | 8/2021 |

OTHER PUBLICATIONS

Extended European Search Report Issued Aug. 28, 2023; 14 pages.

*Primary Examiner* — Kevin K Pyo
(74) *Attorney, Agent, or Firm* — CANTOR COLBURN LLP (57) ABSTRACT

Disclosed herein is a laser beam measurement system that includes a beam measurement device, a positioning apparatus, and a control system. The beam measurement device can include an imager and a plurality of optical elements configured to form an optical path to the imager within the beam measurement device. The positioning apparatus is configured to adjust a position of the beam measurement device relative to a build plate of a laser powder bed fusion system. The control system is configured to determine an intended measurement position to observe a laser beam profile of the laser powder bed fusion system, determine a target position of a beam measurement device to align with the intended measurement position, and command an adjustment of one or more aspects of the beam measurement device to achieve alignment of the target with the intended measurement position.

20 Claims, 4 Drawing Sheets

(56) References Cited

U.S. PATENT DOCUMENTS

| | | |
|---|---|---|
| 2018/0281067 A1 | 10/2018 | Small et al. |
| 2019/0217422 A1 | 7/2019 | Kramer et al. |
| 2019/0329354 A1 | 10/2019 | Deforge et al. |
| 2020/0023461 A1 | 1/2020 | Galbraith et al. |
| 2020/0238605 A1 | 7/2020 | Mitomo et al. |

* cited by examiner

OFF-AXIS LASER BEAM MEASUREMENT FOR LASER POWDER BED FUSION

CROSS-REFERENCE TO RELATED APPLICATIONS

This application claims the benefit of U.S. Provisional Application No. 63/335,906 filed Apr. 28, 2022, the disclosure of which is incorporated herein by reference in its entirety.

BACKGROUND

Exemplary embodiments of the present disclosure pertain to the art of metal additive manufacturing, and more particularly to off-axis laser beam measurement for laser powder bed fusion.

Traditional additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the workpiece, layer-by-layer. The principle behind additive manufacturing processes involves the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. An example of a particular type of system is a Laser Powder Bed Fusion (LPBF) additive system, where the energy beam is a laser.

The laser in a LPBF system is typically focused by a lens, then deflected by a mirror so that the energy beam selectively impinges on a powder bed. In operation, the powder is melted at the laser focus site on the build surface or substrate. Precursor powder is either gravitationally fed from cassettes or loaded by a piston so that it can be raked onto a build table. The excess powder is raked off and collected for re-application. Since the laser is typically fixed, when additive manufacturing techniques are used in a repair or restoration operation, a single part may be processed at a time. Batch processing of multiple parts typically involves machining the parts down to a lowest common part dimension shared by the batch of parts and then adding to all of the parts, layer-by-layer, collectively to rebuild and restore the parts as a group.

BRIEF DESCRIPTION

Disclosed is a laser beam measurement system that includes a beam measurement device, a positioning apparatus, and a control system. The beam measurement device can include an imager and a plurality of optical elements configured to form an optical path to the imager within the beam measurement device. The positioning apparatus is configured to adjust a position of the beam measurement device relative to a build plate of a laser powder bed fusion system. The control system is configured to determine an intended measurement position to observe a laser beam profile of the laser powder bed fusion system, determine a target position of a beam measurement device to align with the intended measurement position, and command an adjustment of one or more aspects of the beam measurement device to achieve alignment of the target with the intended measurement position.

In addition to one or more of the features described above, or as an alternative to any of the foregoing embodiments, the adjustment of one or more aspects of the beam measurement device can include the positioning apparatus changing an angle of the beam measurement device relative to the build plate.

In addition to one or more of the features described above, or as an alternative to any of the foregoing embodiments, an optical path length within the beam measurement device can be adjustable to match an intended path length of a laser beam to the intended measurement position.

In addition to one or more of the features described above, or as an alternative to any of the foregoing embodiments, the adjustment of one or more aspects of the beam measurement device can include moving one or more of the optical elements.

In addition to one or more of the features described above, or as an alternative to any of the foregoing embodiments, the adjustment can maintain a path length of the optical path within the beam measurement device to accommodate a change in the target position.

In addition to one or more of the features described above, or as an alternative to any of the foregoing embodiments, the adjustment can maintain a path length of the optical path within the beam measurement device to accommodate a change in the target position.

In addition to one or more of the features described above, or as an alternative to any of the foregoing embodiments, the optical elements can include one or more semi-transparent mirrors and one or more beam dumps.

In addition to one or more of the features described above, or as an alternative to any of the foregoing embodiments, a path length of the optical path within the beam measurement device can be greater than a height of a port of the beam measurement device from a build plane.

In addition to one or more of the features described above, or as an alternative to any of the foregoing embodiments, the control system can be configured to output the command to a user interface.

In addition to one or more of the features described above, or as an alternative to any of the foregoing embodiments, the control system can be configured to analyze the laser beam profile at the target position as observed by the imager, compare the laser beam profile to an expected beam profile, and trigger an alert based on determining that the laser beam profile fails to match the expected beam profile within a comparison threshold.

In addition to one or more of the features described above, or as an alternative to any of the foregoing embodiments, the beam measurement device can be integrated into a recoater of the laser powder bed fusion system.

Also disclosed is a method for laser beam measurement in a laser powder bed fusion system. The method includes determining an intended measurement position to observe a laser beam profile of the laser powder bed fusion system by a beam measurement device, determining a target position of the beam measurement device to align with the intended measurement position, and commanding an adjustment of one or more aspects of the beam measurement device to achieve alignment of the target with the intended measurement position. A positioning apparatus is configured to adjust a position of the beam measurement device relative to a build plate of the laser powder bed fusion system.

In addition to one or more of the features described above, or as an alternative to any of the foregoing embodiments, the method can include outputting the command to a user interface.

In addition to one or more of the features described above, or as an alternative to any of the foregoing embodiments, the method can include operating the beam measurement device to observe the laser beam profile after adjusting one or more aspects of the beam measurement device, analyzing the laser beam profile at the target position as observed by the imager, comparing the laser beam profile to an expected beam profile, and triggering an alert based on determining that the laser beam profile fails to match the expected beam profile within a comparison threshold.

A technical effect of the apparatus, systems and methods is achieved by performing off-axis laser beam measurement for laser powder bed fusion as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Additive manufacturing has resulted in metal parts with decreased weight, added functionality and new design possibilities. Deposition method parameters may be selected to yield a desired average grain size. In some embodiments the average grain size is varied by location. In some embodiments the average grain size is consistent throughout. The thickness of the deposited layer can vary depending on the deposition method and desired average grain size.

When directed energy deposition is used, laser power, toolpath speed, and layer thickness can be selected to yield the desired average grain size and layer thickness. In general, lower laser power and slower toolpath speed results in a smaller average grain size and higher laser power and faster toolpath speed results in a larger average grain size.

Exemplary metals used in additive manufacturing can include nickel, cobalt, copper, titanium, aluminum, iron, alloys including one or more of the foregoing metals, and combinations thereof. Exemplary alloys can include Iconel 718, Iconel 625, stainless steel, Waspaloy and IN100. Metal powder particle size and particle size distribution in powder can be determined by one of skill in the art.

Additive manufacturing can be used to build new parts or to repair damaged parts. The powder-bed fusion method allows for batch processing of multiple parts within a build volume. Selective laser sintering/melting in a powder bed can be used to perform weld build-up, for example. If the laser beam profile is not as intended, the weld pool (melt pool) will not be the correct shape, potentially inducing defects in the part. Commercial beam measurement devices are typically intended to be operated at a single location on a print platform of a LPBF machine, which is not sufficient where parts are printed across the print platform. Different locations on the print platform may have different beam profiles and temporal responses to beam irradiance based on several factors, such as, aberrations and astigmatism in laser optics, cleanliness of laser optics (especially build chamber laser entry window), inadequate calibration of focusing optics and/or positioning mirrors, and the like. Time varying beam profile can change due to thermal lensing, which can result in a change in focal distance of optics due to heating. For multi-laser systems, each beam may have a different profile at a given location on the print platform, leading to inconsistent print results depending on which laser is used. The lasers may also lose alignment relative to each other, potentially leading to defects in parts and/or increased surface roughness. Embodiments of the disclosure can include hardware and software that support positioning of a beam measurement device and associated optic elements to perform laser beam profile measurement at a location in space that accommodates factors such as machine design and optical variations to adjust one or more aspects of the beam measurement device to achieve alignment of a target with an intended measurement position. For example, performing laser beam profile measurement at a non-optimized depth position may not align with the beam focal point at the melt pool.

Figure 1:
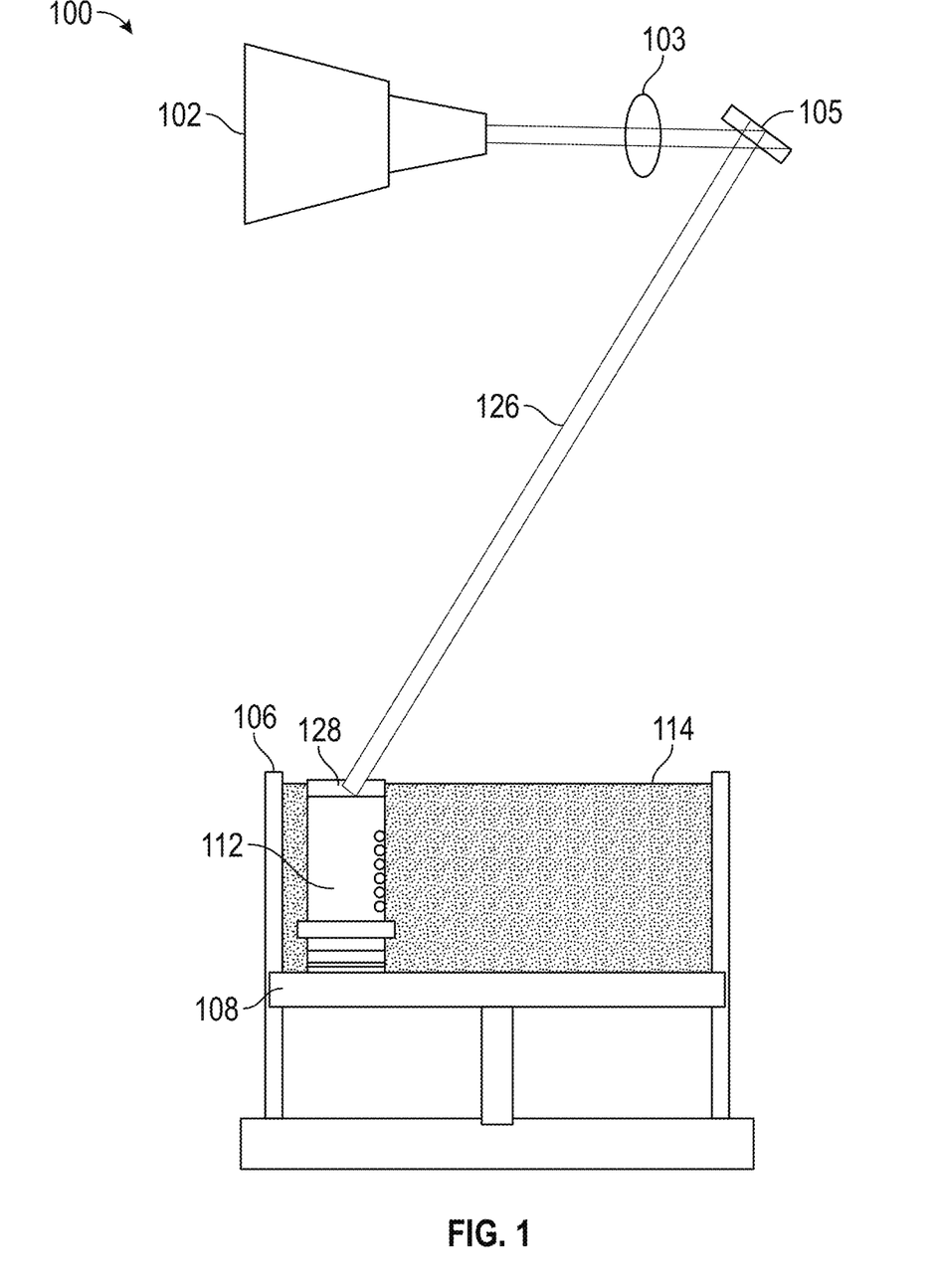
FIG. 1 is a schematic view of a laser powder bed fusion system according to an embodiment.

FIG. 1 shows a schematic view of a laser powder bed fusion system 100 according to an embodiment as an example of an additive manufacturing system. The laser powder bed fusion system 100 includes an energy source 102, a lens system 103, one or more mirrors 105, positioning apparatus 151 and a build tank 106. The build tank 106 includes a base plate 108. The base plate 108 can be adjustable to reposition one or more parts 112 as the parts 112 are built or repaired in a powder bed 114 of the build tank 106. Alternatively, the build plate 108 and one or more parts 112 can remain in a fixed position. The energy source 102 can emit a laser 126 (also referred to as laser beam 126) to form a new layer 128 of material fused on an uppermost level of the parts 112. One or more of the mirrors 105 can be adjusted to change the target location of the laser 126. Since the build location of the one or more parts 112 within the build tank 106 can change, beam measurement systems that inspect the laser 126 before and/or after use at a fixed position, such as the center of the build tank 106 may not observe the actual performance of the laser 126 when targeted at other locations within the build tank 106.

Figure 2:
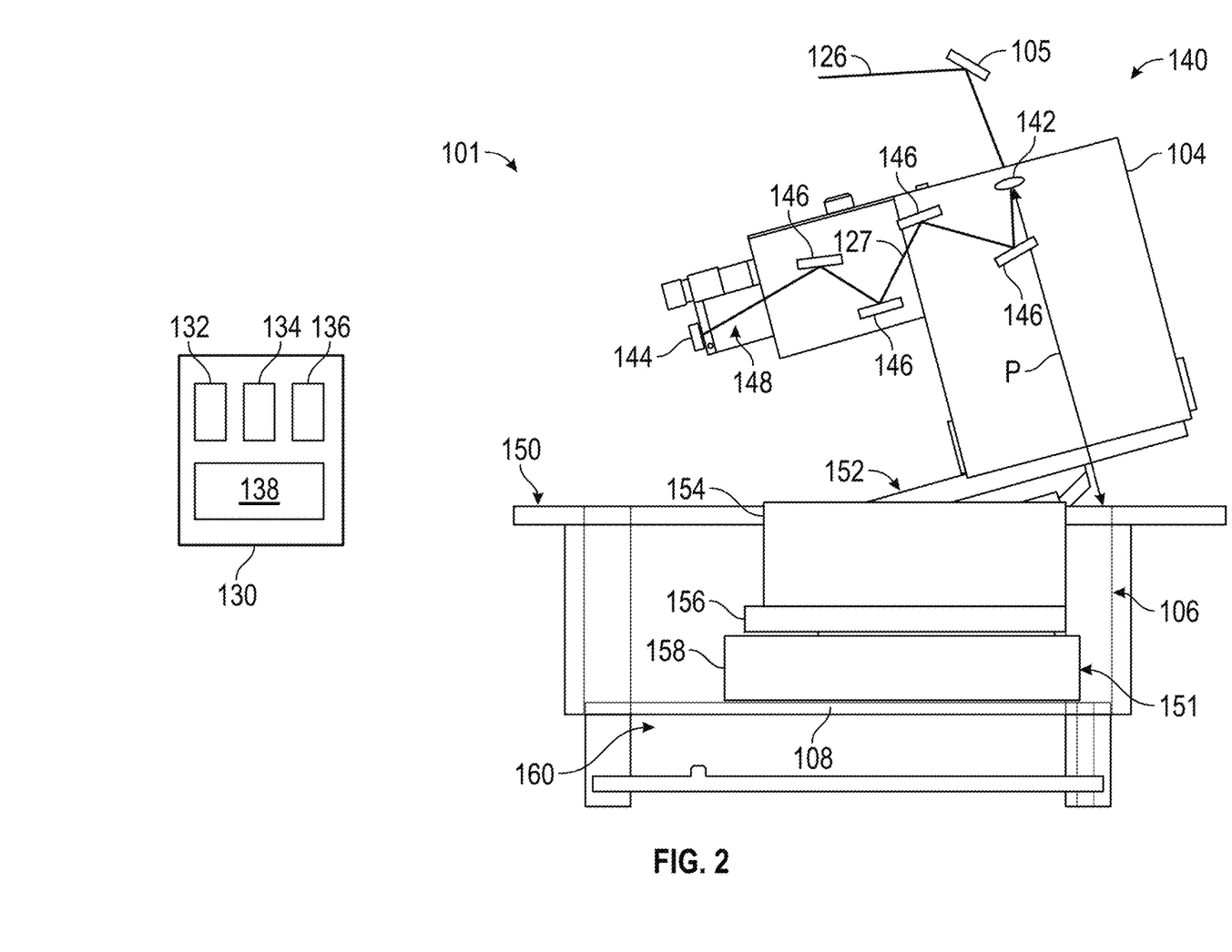
FIG. 2 is a schematic view of a measurement system according to an embodiment.

In the example of FIG. 2, a beam measurement system 101 is depicted. The beam measurement system 101 can include a beam measurement device 104 positioned within the build tank 106. The beam measurement device 104 can be used to inspect a beam profile of the laser 126 before or after parts 112 of FIG. 1 are built within the build tank 106. In some embodiments, a control system 130 can be used to determine a placement position of the beam measurement device 104 within the build tank 106. The control system 130 can be used to determine one or more commands for an adjustment of one or more aspects of the beam measurement device 104 to achieve alignment of a target with an intended measurement position. In embodiments, the control system 130 is configured to determine an intended measurement position to observe a laser beam profile of a laser 126 of the laser powder bed fusion system 100 of FIG. 1 and determine a target position of a beam measurement device 104 to align with the intended measurement position. In some embodiments, the control system 130 can determine positioning of other components, such as mirrors 105. Operation of the laser 126 can be separately controlled.

The laser 126 can be guided by one or more optical elements 140, such as mirrors 105, and be received as an incident beam 127 observed by the beam measurement device 104. Various optic elements 140 external to the beam measurement device 104 can direct the incident beam 127 as a portion of the laser beam 126 into a port 142 of the beam measurement device 104. The beam measurement device 104 can include an imager 144 and a plurality of optical elements 146 configured to form an optical path 148 to the imager 144 within the beam measurement device 104. The optical elements 140, 146 can include one or more mirrors and one or more beam dumps. Some of the optical elements 140, 146 can be adjustable/movable while others can be fixed. As one example, the optical elements 146 within the beam measurement device 104 may be fixed, while the optical elements 140 external to the beam measurement device 104 can be movable. The number and position of the optical elements 140, 146 depicted in FIG. 1 is for purposes of illustration and should not be construed as limiting. A path length of the optical path 148 within the beam measurement device 104 can be greater than a path P from the port 142 to a build plane 150. The path P represents the path that the laser beam 126 would normally take to the build tank 106 if the beam measurement device 104 was not positioned within the build tank 106. The path P may be equivalent to a height of the port 142 to the build plane 150.

Where adjustment of the optical elements 146 within the beam measurement device 104 is not possible, the position of the beam measurement device 104 can be adjusted by a positioning apparatus 151. The positioning apparatus 151 can include, for example, an adapter plate 152 to mount the beam measurement device 104 to the positioning apparatus 151. The positioning apparatus 151 can also include a goniometer 154 to set a tilt angle and/or measure a range of motion in tilting the beam measurement device 104. The positioning apparatus 151 can also include a rotation stage 156 to rotate the beam measurement device 104 relative to the base plate 108. The positioning apparatus 151 can also include an X-Y stage 158 to translate movement of the beam measurement device 104 relative to the base plate 108 in X-Y coordinates. The positioning apparatus 151 can be coupled to a mounting plate 160. It will be understood that the positioning apparatus 151 can include other elements to support position adjustment and provide position feedback regarding the location and orientation of the beam measurement device 104. Adjustments to the positioning apparatus 151 can be performed manually and/or automatically, for instance, as commanded by the control system 130. In a manual mode, the command output of the control system 130 can be in terms of instructions or position settings to adjust the positioning apparatus 151 and/or one or more aspects of the beam measurement device 104 and/or optic elements 140.

The control system 130 can include a processing system 132 and a memory system 134, where the memory system 134 stores executable instructions to configure the processing system 132 to perform a plurality of operations. The processing system 132 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 134 can store data and instructions that are executed by the processing system 132. In embodiments, the memory system 134 may include random access memory (RAM), read only memory (ROM), or other electronic, optical, magnetic, or any other computer readable medium onto which is stored data and algorithms in a non-transitory form. The control system 130 can also include an input/output (I/O) interface 136 operable to interface with various components of the laser powder bed fusion system 100 to sense, control, and communicate with components of FIG. 2 and other components, such as a user interface 138. The user interface 138 can include a display, buttons, keys, switches, and other such interfaces for accepting user input and displaying output.

Figure 3:
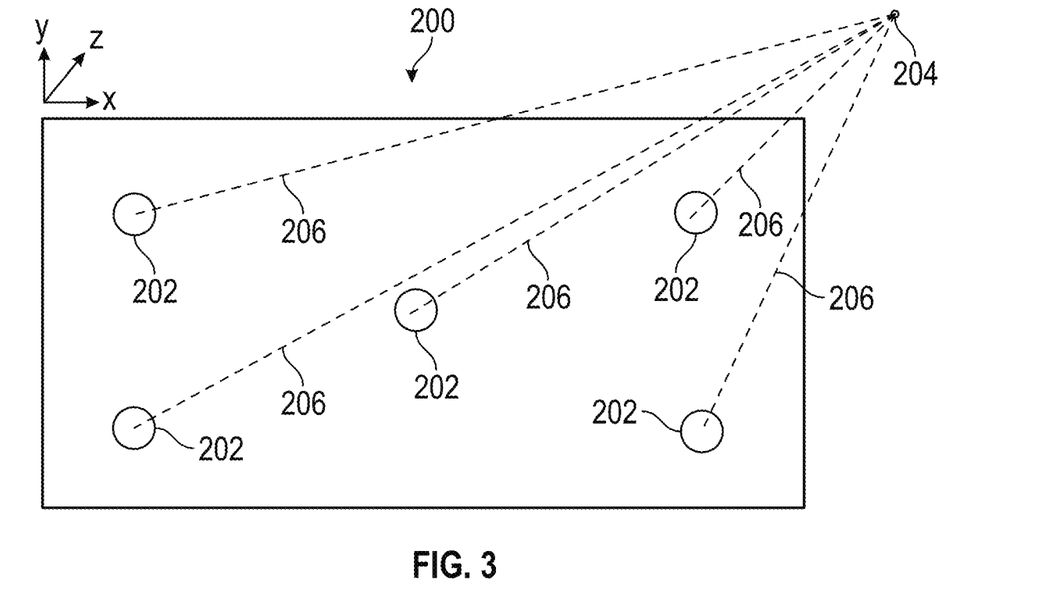
FIG. 3 is a schematic view of a build plate of a laser powder bed fusion system that includes multiple build locations according to an embodiment.

FIG. 3 is a schematic view 200 of a build plate 108 of the laser powder bed fusion system 100 that includes multiple build locations 202 according to an embodiment. The build locations 202 can be offset in x-axis and y-axis directions relative to a surface of a base plate 108. In the example of FIG. 3, each of the build locations 202 can be defined in terms of X-Y-Z coordinates. A location 204 in X-Y-Z space may be computed by the control system 130 of FIG. 2 as a target position to align with the intended measurement position for each of the build locations 202. A projection 206 between the build locations 202 and the location 204 can be used to establish one or more positioning adjustments and set one or more angles. Getting the length and angular positions set to match the laser beam profile at the build locations 202 can ensure that observations made by the imager 144 of FIG. 2 align with the laser beam profiles at each of the build locations 202. The example of FIG. 3 is provided for purposes of explanation and is not limiting. A single part 112 of FIG. 1 can be manufactured at any of the build locations 202 or multiple parts 112 can be built in parallel at several of the build locations 202. Multiple instances of the beam measurement device 104 can be used in parallel, for example, to support the use of multiple lasers 126 in parallel builds within the build tank 106 of FIG. 1. In some embodiments, multiple lasers 126 can share a single instance of the beam measurement device 104.

Figure 4:
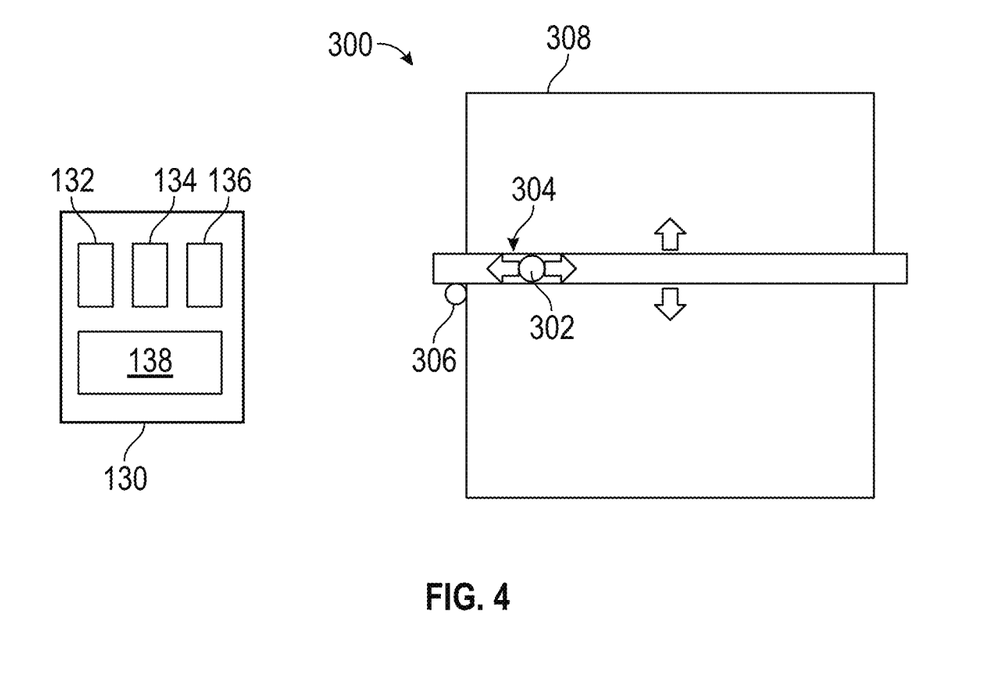
FIG. 4 is a schematic view of an integrated beam measurement device incorporated into a recoater of a laser powder bed fusion system according to an embodiment.

FIG. 4 is a schematic view of an integrated beam measurement device 302 incorporated into a recoater 304 of a laser powder bed fusion system 300 according to an embodiment. The laser powder bed fusion system 300 can include an actuator 306 and a build plate 308. The actuator 306 can control movement of the recoater 304 relative to the build plate 308. For instance, the recoater 304 may be driven in a Y-axis direction, while the integrated beam measurement device 302 is driven to move in an X-axis direction, such that the integrated beam measurement device 302 can view any location on the build plate 308. The control system 130, as previously described with respect to FIG. 2, can control movement of the recoater 304 and the integrated beam measurement device 302 relative to the build plate 308. Further, the control system 130 can control one or more aspects within the integrated beam measurement device 302. Although described in the example of FIG. 4 as being incorporated in recoater 304, the integrated beam measurement device 302 can be incorporated into another movable component that can move in at least two axis directions (XY) relative to the surface above the build plate 308.

Observations made by the integrated beam measurement device 302 can be made on a layer-by-layer basis to provide inspection as the parts 112 of FIG. 1 are built. In some embodiments, multiple lasers 126 can share a single instance of the integrated beam measurement device 302.

Figure 5:
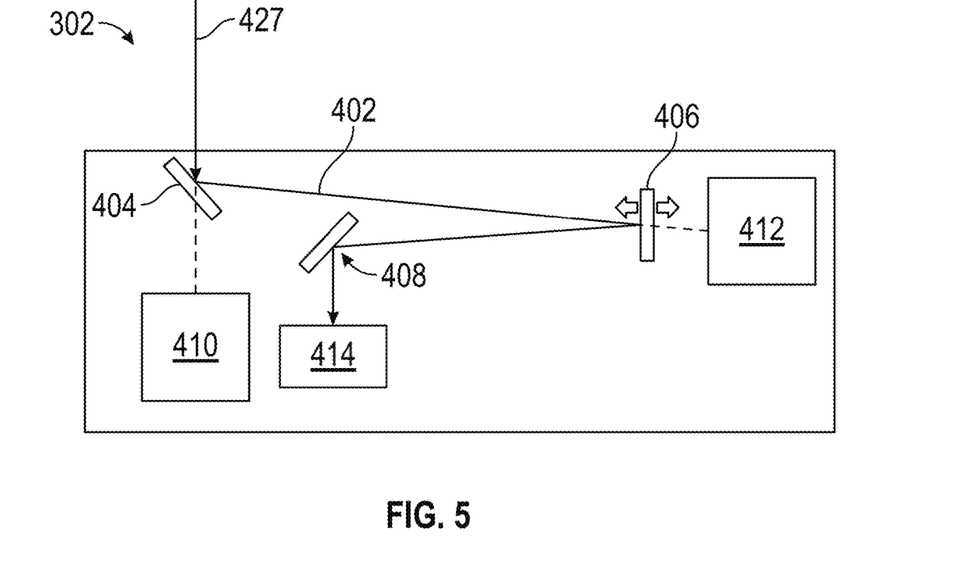
FIG. 5 is a schematic view of an optical path within a beam measurement device according to an embodiment.

FIG. 5 is a schematic view of an optical path 402 within the integrated beam measurement device 302 according to an embodiment. The integrated beam measurement device 302 can include one or more mirrors 404, 406, 408, one or more beam dumps 410, 412, and an imager 414. In the example of FIG. 5, an incident beam 427, similar to the incident beam 127 of FIG. 2, can be received from one or more lasers 126 (FIG. 1). The mirror 404 can be a fixed, semi-transparent mirror that reflects a portion of the incident beam 427 along the optical path 402 to the mirror 406 and allows a remaining portion of the incident beam 427 to be absorbed by the beam dump 410. The mirror 406 can be a moveable semi-transparent mirror that reflects a portion of the incident beam 427 along the optical path 402 to the mirror 408 and allows a remaining portion of the incident beam 427 to be absorbed by the beam dump 412. As one example, a semi-transparent mirror can allow most of the laser energy of the incident beam 427 to be transmitted (e.g., not reflected) so the imager 414 does not get burned. The mirror 408 can be a fixed, fully reflecting mirror that directs the remaining portion of the incident beam 427 to the imager 414.

Accordingly, a series of mirrors 404, 406, 408 can be utilized within the integrated beam measurement device 302 to automatically adjust the path length of the optical path 402 within the integrated beam measurement device 302 to ensure that no matter where the target measurement location is, the laser beam profile is measured at the same path length that the laser would experience in normal operation (i.e., during the laser powder bed fusion printing process). At least one of these mirrors (e.g., mirror 406) can be moveable to adjust the path length. The mirrors 404, 406 can be semi-transparent mirrors such that the incident laser intensity is attenuated to appropriate levels before being imaged. Beam dumps 410, 412 to dissipate the excess laser intensity may be included behind each semi-transparent mirror 404, 406. It will be understood that additional elements can be included in the integrated beam measurement device 302. For instance, any number of optical elements can be included other than the specific configuration as depicted in the example of FIG. 5.

Figure 6:
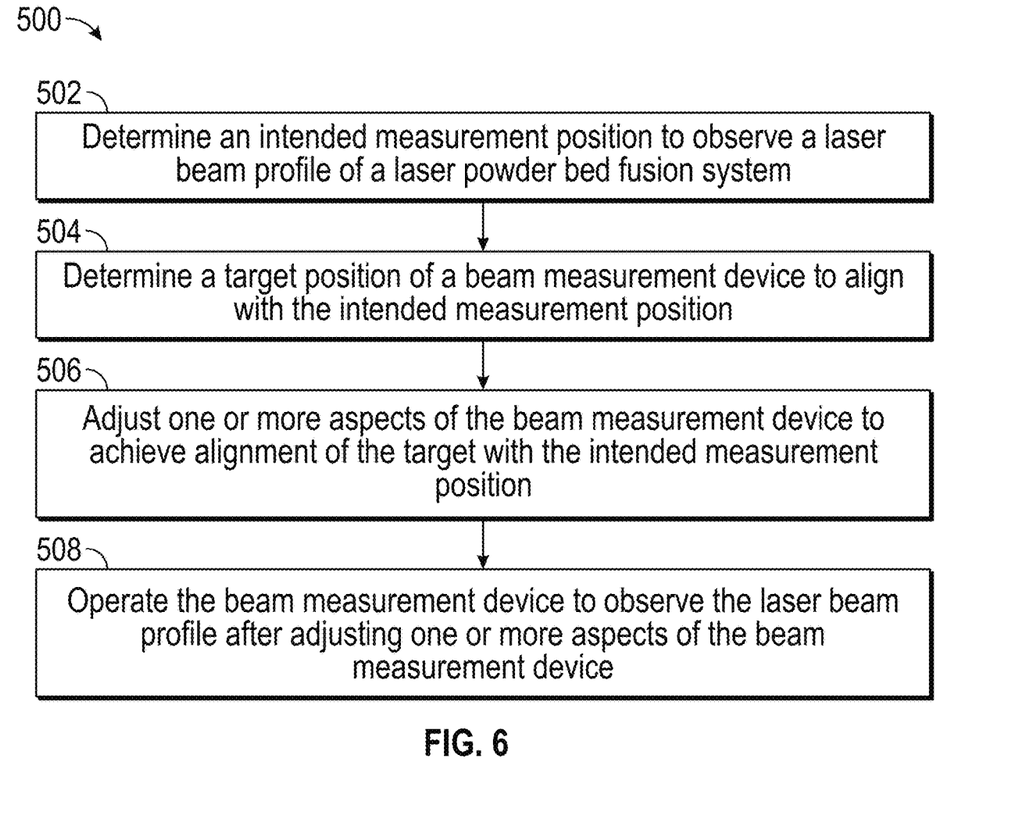
FIG. 6 is a process flow according to an embodiment.

Turning to FIG. 6, a flowchart shows a method 500 for additive manufacturing according to an embodiment. The method 500 of FIG. 6 is described with respect to FIGS. 1-6 and may include additional steps beyond those depicted in FIG. 6. The method 500 can be controlled by a control system, such as the control system 130 of FIG. 2. Some portions of the method 500 can be manually performed depending on the amount of automation available. The method 500 is described primarily in reference to the laser powder bed fusion system 100 of FIG. 1 and the laser powder bed fusion system 300 of FIG. 4 for purposes of explanation, although it will be understood that any of the components previously described can be used depending upon the system configuration.

At block 502, an intended measurement position to observe a laser beam profile of the laser powder bed fusion system 100, 300 by a beam measurement device 104, 302 can be determined, for instance, by the control system 130. At block 504, a target position of the beam measurement device 104, 302 can be determined to align with the intended measurement position, for instance, by the control system 130. At block 506, an adjustment of one or more aspects of the beam measurement device 104, 302 can be commanded to achieve alignment of the target with the intended measurement position. Commands can be automated or be in the form of instructions for positional settings for manual adjustments as needed. A positioning apparatus 151 can be configured to adjust a position of the beam measurement device 104 relative to a build plate 108 of the laser powder bed fusion system 100. The actuator 306 is another example of a positioning apparatus that can be configured to adjust a position of the beam measurement device 302 relative to a build plate 308 of the laser powder bed fusion system 300. At block 508, the beam measurement device 104, 302 can be operated to observe the laser beam profile after adjusting one or more aspects of the beam measurement device 104, 302.

In some embodiments, the adjustment of one or more aspects of the beam measurement device 104 can include the positioning apparatus 151 changing an angle of the beam measurement device relative 104 to the build plate 108. The angle can be defined in three-dimensional space. In some embodiments, the adjustment of one or more aspects of the beam measurement device 104, 302 can include moving one or more of the optical elements, such as optical elements 140, 146, or mirrors 404, 406, 408. The adjustment can maintain a path length of the optical path 148, 402 within the beam measurement device 104, 302 to accommodate a change in the target position. A path length of the optical path 148 within the beam measurement device 104 can be greater than a height of the port from a build plane 150 along path P. An optical path length within the beam measurement device can be adjustable to match an intended path length of a laser beam to the intended measurement position.

In some embodiments, the laser beam profile can be analyzed at the target position as observed by the imager 144, 414. The control system 130 can compare the laser beam profile to an expected beam profile and trigger an alert based on determining that the laser beam profile fails to match the expected beam profile within a comparison threshold. The alert can indicate that the part 112 need inspection or rework before completing the manufacturing process. Embodiments can support additive manufacturing for multiple parts 112 simultaneously.

In summary, embodiments allow for the measurement of beam profile at any location across a build platform. This allows the user to ensure that the beam profile is within specification across the entire build platform. This knowledge will increase the certainty that the machine is operating as intended and may reduce the reliance on mechanical property specimens for certification of additive manufactured parts. Embodiments can also enable feedback control of the laser focus during the build. For multi-laser systems, beam profile measurement can ensure that the beam profile for different lasers acting at the same location are adequately similar, increasing consistency and uniformity of the process. This can also ensure that multiple beams are aligned to each other and the ability to correct inadequate alignment.

A beam profile measurement device can be positioned such that it measures the laser beam in a state that it will be used during printing. To accomplish this, the beam profile measurement device is configured to work with the laser powder bed fusion machine of interest or be positioned using a secondary device tailored to the purpose. The positioning apparatus can place the measurement device at the appropriate angle and location such that the measurement occurs at the same path length as the laser would travel to impact the build plane. The total path length of the laser system, geometry of the laser powder bed fusion build chamber, optical path of the laser system, and target location on the build plane can be used to determine the appropriate location for the beam profile measurement device. It may be advantageous for the path length within the beam measurement device to be longer than the height of the device such that the device can be placed at a point in space above the build plane, allowing the device to measure out to the extents of the buildable area.

In some embodiments, the laser powder bed fusion optics can utilize scanning galvanometers. The distance from the build plane to the first mirror and distance between mirrors can be computed/known. This information, coupled with the target X,Y,Z location of the measurement and the path length of the laser within the measurement device can allow for the calculation of the appropriate intermediate point and orientation in space at which the measurement device should be placed.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A laser beam measurement system comprising:
   a beam measurement device comprising an imager and a plurality of optical elements configured to form an optical path to the imager within the beam measurement device;
   a positioning apparatus configured to adjust a position of the beam measurement device relative to a build plate of a laser powder bed fusion system; and
   a control system configured to determine an intended measurement position to observe a laser beam profile of a laser of the laser powder bed fusion system, determine a target position of a beam measurement device to align with the intended measurement position, and command an adjustment of the positioning apparatus changing an angle of the beam measurement device relative to the build plate to achieve alignment of a target with the intended measurement position placing the beam measurement device at the angle and a location such that measurement occurs at a same path length as the laser would travel to impact a build plane.

2. The laser beam measurement system of claim 1, wherein an optical path length within the beam measurement device is adjustable to match an intended path length of a laser beam to the intended measurement position.

3. The laser beam measurement system of claim 1, wherein one or more of the optical elements are movable.

4. The laser beam measurement system of claim 3, wherein the adjustment maintains a path length of the optical path within the beam measurement device to accommodate a change in the target position.

5. The laser beam measurement system of claim 1, wherein the optical elements comprise one or more semi-transparent mirrors and one or more beam dumps.

6. The laser beam measurement system of claim 1, wherein a path length of the optical path within the beam measurement device is greater than a height of a port of the beam measurement device from the build plane.

7. The laser beam measurement system of claim 1, wherein the control system is configured to output the command to a user interface.

8. The laser beam measurement system of claim 1, wherein the control system is configured to analyze the laser beam profile at the target position as observed by the imager, compare the laser beam profile to an expected beam profile, and trigger an alert based on determining that the laser beam profile fails to match the expected beam profile within a comparison threshold.

9. A method for laser beam measurement in a laser powder bed fusion system, the method comprising:
   determining an intended measurement position to observe a laser beam profile of a laser of the laser powder bed fusion system by a beam measurement device;
   determining a target position of the beam measurement device to align with the intended measurement position; and
   commanding an adjustment of a positioning apparatus changing an angle of the beam measurement device relative to a build plate to achieve alignment of a target with the intended measurement position placing the beam measurement device at the angle and a location such that measurement occurs at a same path length as the laser would travel to impact a build plane, wherein the positioning apparatus is configured to adjust a position of the beam measurement device relative to the build plate of the laser powder bed fusion system.

10. The method of claim 9, wherein an optical path length within the beam measurement device is adjustable to match an intended path length of a laser beam to the intended measurement position.

11. The method of claim 9, wherein one or more of the optical elements are movable.

12. The method of claim 11, wherein the adjustment maintains a path length of the optical path within the beam measurement device to accommodate a change in the target position.

13. The method of claim 9, wherein the optical elements comprise one or more semi-transparent mirrors and one or more beam dumps, and at least one of the one or more semi-transparent mirrors is movable.

14. The method of claim 9, wherein a path length of the optical path within the beam measurement device is greater than a height of a port of the beam measurement device from the build plane.

15. The method of claim 9, further comprising:
   outputting the command to a user interface.

16. The method of claim 9, further comprising:
operating the beam measurement device to observe the laser beam profile after adjusting one or more aspects of the beam measurement device;
analyzing the laser beam profile at the target position as observed by the imager;
comparing the laser beam profile to an expected beam profile; and
triggering an alert based on determining that the laser beam profile fails to match the expected beam profile within a comparison threshold.

17. A laser beam measurement system comprising:
a beam measurement device comprising an imager and a plurality of optical elements configured to form an optical path to the imager within the beam measurement device;
a positioning apparatus configured to adjust a position of the beam measurement device relative to a build plate of a laser powder bed fusion system; and
a control system configured to determine an intended measurement position to observe a laser beam profile of a laser of the laser powder bed fusion system, determine a target position of a beam measurement device to align with the intended measurement position, and command an adjustment of the beam measurement device relative to the build plate to achieve alignment of a target with the intended measurement position, wherein a path length of the optical path within the beam measurement device is greater than a height of a port of the beam measurement device from a build plane.

18. The laser beam measurement system of claim 17, wherein an optical path length within the beam measurement device is adjustable to match an intended path length of a laser beam to the intended measurement position.

19. The laser beam measurement system of claim 17, wherein the adjustment maintains a path length of the optical path within the beam measurement device to accommodate a change in the target position.

20. The laser beam measurement system of claim 17, wherein the control system is configured to analyze the laser beam profile at the target position as observed by the imager, compare the laser beam profile to an expected beam profile, and trigger an alert based on determining that the laser beam profile fails to match the expected beam profile within a comparison threshold.

* * * * *